United States Patent [19]
Wrobel et al.

[11] Patent Number: 4,613,778
[45] Date of Patent: Sep. 23, 1986

[54] ELECTRIC MOTORS

[75] Inventors: Günter Wrobel, Villingen; Ulrich Koletzki, St. Georgen, both of Fed. Rep. of Germany

[73] Assignee: Papst-Motoren GmbH & Co. KG, St. Georgen, Fed. Rep. of Germany

[21] Appl. No.: 644,142

[22] Filed: Aug. 24, 1984

Related U.S. Application Data

[63] Continuation of Ser. No. 367,894, Apr. 13, 1982, abandoned.

[30] Foreign Application Priority Data

Apr. 14, 1981 [CH] Switzerland ............ 2463/81

[51] Int. Cl.⁴ ............................................. H02K 5/16
[52] U.S. Cl. .................................. 310/90; 310/67 R
[58] Field of Search ................................ 310/90, 67

[56] References Cited

U.S. PATENT DOCUMENTS

| | | | |
|---|---|---|---|
| 3,013,167 | 12/1961 | Bobula | 310/90 |
| 3,038,765 | 6/1962 | Tupper | 310/90 |
| 3,161,794 | 12/1964 | Lindgren | 310/90 |
| 3,319,098 | 5/1967 | Hartman | 310/90 |
| 3,387,153 | 6/1968 | Grad | 310/90 |
| 3,513,339 | 5/1970 | Harris et al. | 310/90 |
| 3,624,434 | 11/1971 | Daffler et al. | 310/90 |
| 3,720,882 | 3/1973 | Vieweg et al. | 310/90 |
| 3,816,782 | 6/1974 | Dow et al. | 310/90 |
| 3,919,572 | 11/1975 | Desy | 310/67 X |

Primary Examiner—Donovan F. Duggan
Attorney, Agent, or Firm—Fitch, Even, Tabin & Flannery

[57] ABSTRACT

A construction is provided for reducing axial rotor oscillations in a small electric motor having a stator, a rotor, a shaft and sleeve bearings having end faces, the sleeve bearings journalling the shaft. The construction includes a rotation element having a sliding surface at one of its axial ends, a spring element urging the sliding surface in sliding contact with a face of the adjacent sleeve bearing and a driving connection for rotating the rotation element in synchronism with the motor shaft during rotation thereof.

15 Claims, 8 Drawing Figures

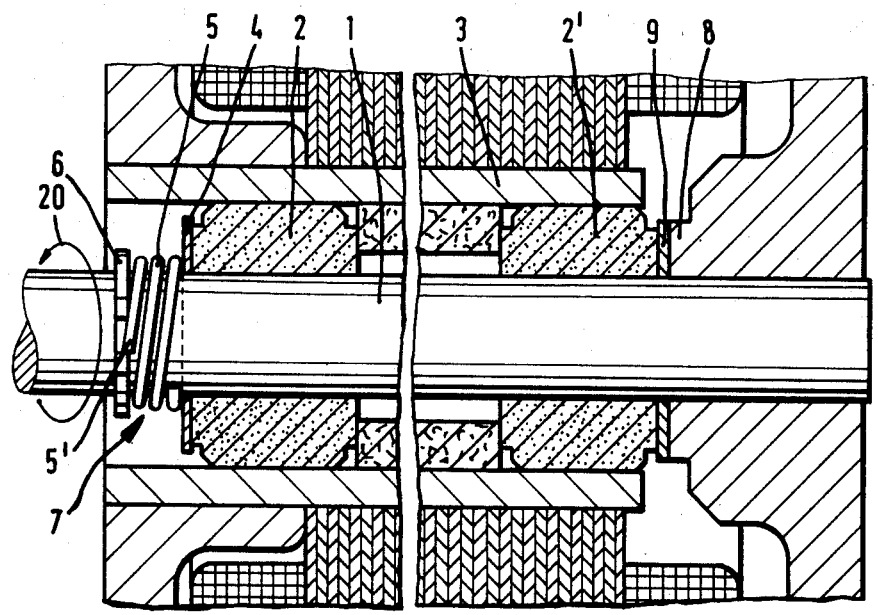
Fig. 1
Fig. 2
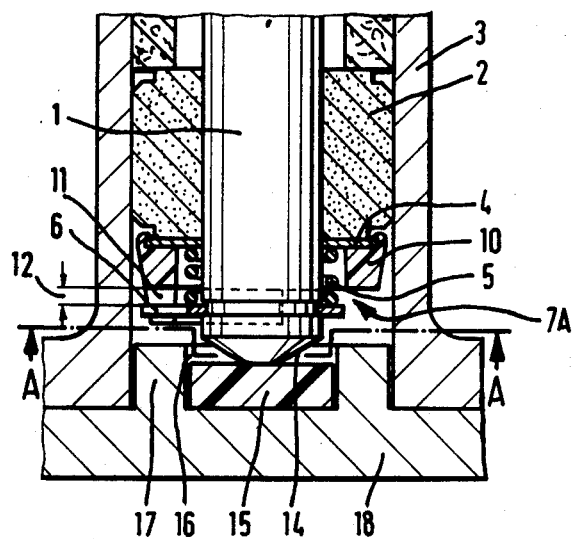
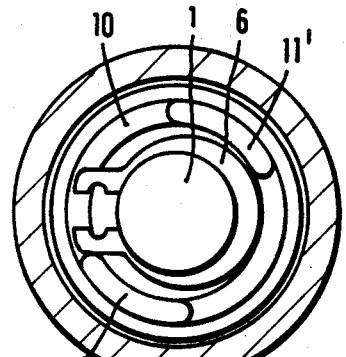
Fig. 3

ELECTRIC MOTORS

This application is a continuation of application Ser. No. 367,894 filed Apr. 13, 1982, now abandoned.

This invention relates to small electric motors, and particularly to a construction in small electric motors for the reduction or complete elimination of axial rotor oscillations. When the shaft in such motors is in a horizontal or in a certain inclined position, vibrations may occur that are caused by the mass of the rotor in, for example, fans by forces produced by the fan blades, or by electromagnetic axial force components. These forces need to be counteracted. Because of these forces, the free running motor tends to fall into axial oscillations within the normal shaft end play which oscillations further cause undesirable noise. These small motors, as typically found in the marketplace, may have rugged construction and have generally stood the test of time, but there does occur erratic running caused by the well-known axial rumble in the assembled motors, especially such motors that have been produced in a more sophisticated, mass production manufacturing process. This noise is basically caused by the electromagnetic field which produces vibrations as a result of small irregularities in the air gap and by axial oscillations. According to the magnitude of the typical end play, which may range between 0.1 and 0.8 mm by reason on the manufacturing process, and according to the resonance behavior of the apparatus in which the motor will be inserted, the noises can be so great as to be totally unacceptable.

Solutions to this problem have been offered in the past. For example, it is known from German Pat. No. 2,701,295 to utilize ball bearings in small motors. Ball bearings, of course, are expensive. Also, various noise-muffling elements have been tried. For example, it has been tried to locate steel disks of about 0.1 mm in thickness against slide bearings and fix the steel disks onto the shafts to limit the end play. This is not practical, however, in large quantity manufacturing. Another solution that has been tried is the provision of combination of disks, that is, by bonding a loosely fitting steel washer as a disk of 0.3 mm thickness which does not otherwise touch the shaft onto a plastic disk which is suitably bonded to the shaft. This combination is also expensive.

Although the assembly time for the foregoing might be decreased, it is believed that the production costs are still too high for such a combination. Further, the noise-muffling that is obtained by this disk combination is not sufficient. Another solution has been tried by using the so-called D-shaped lock disks which fit on shafts having been milled to a matching profile, i.e., the shaft in cross section being also D-shaped. Such, however, could not be accurately positioned because of the tolerances of the journal bearings, which generally are of a sintered material. This is also unsuitable because during assembly too much time is taken to locate and match the disks with the shaft.

A reduction in the axial noise has been indeed obtained when using compression springs loosely inserted on the shafts between the journal bearings and the end of the shaft, but so far these have been unreliable because of their undefined friction properties. For example, according to German Utility Model No. 8031301.7, a muffling element in the form of a sleeve which is made of elastic material in the axial direction, such as of rubber or a rubber-like material, is placed against the face of a ring disk, which lies intermediate the elastic material and the face of a journal bearing, is loosely mounted onto the motor shaft.

It has been found, however, that the ring disk not being connected with the motor shaft for rotation therewith is a disadvantage. There is no assurance of a true interfacial relationship between the ring disk and the slide bearing. There may be, for example, slide movements occurring at places other than this interfacial area of the slide bearing and the adjacent surface of the ring disk, because, for example, of friction wearing down the elastic material resulting in sliding movements between the elastic material and adjacent surfaces and these slide movements could possibly cause a wear in the muffling elements resulting in an early failure of the bearing system.

It is an object of this invention to provide a construction in a small motor of the foregoing type that is simple and results in ease of assembly and that will substantially reduce, or entirely eliminate, axial oscillations in the motor. It is desirable that this be accomplished in a location in the motor where lubricants are reliably present so that the longest possible durability of the bearing system is obtained.

Other objects and advantages of the invention will become apparent and the invention better understood by reference to the following detailed description read in conjunction with the accompanying drawings in which:

FIG. 1 is a sectional fragmentary view of one embodiment of construction according to this invention for the reduction of axial rotor oscillations in an electric motor;

FIG. 2 is a sectional fragmentary view of another embodiment showing a construction also in accordance with this invention;

FIG. 3 is a sectional view along the line AA of the construction shown in FIG. 2;

Figure 5:
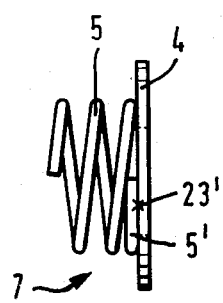
FIG. 5 is a side view of the rotation element according to FIG. 4.

Briefly, the invention includes spring means, hardened smooth surface for interfacial sliding of elements with lubrication, the spring means urging the interfacial relation between the sliding surfaces, and means for rotating the combination of the spring means and the sliding surface in synchronism with the motor shaft. In the invention, this generally takes the form of a rotation element 7, as shown in FIG. 1, along with a driving element 6. An alternative embodiment is shown in FIG. 2 wherein there is a rotation element 7A in combination with a driving element 6. In both constructions, the spring device urges the driven element into interfacial relationship with a journal or sleeve bearing 2, which generally is of a sintered material carrying lubrication in its pores. Thus, there is lubrication between the interfaces of the driven element and the sleeve bearing, and slide movements are only possible between the face of the sleeve bearing and the adjacent surface of the rotation element because the rotation element is caused to rotate in synchronism with the motor shaft. This reduces the noise produced by axial oscillations without requiring additional space for inserting the noise reduction elements in the bearing system. Furher, with the embodiments according to this invention, standard bearings can be used without changing the structural design of the stator and the rotor.

More particularly, FIG. 1 shows in a sectional fragmentary view, a construction in accordance with the invention that results in a substantial reduction of axial rotor oscillations in small electric motors. There is provided a motor shaft 1 which is mounted in two journal or slide bearings in the form of sleeve bearings 2 and 2'. These sleeve bearings 2 and 2' are mounted within a bearing tube 3. A hardened ring or sliding ringlike disk 4 made of steel in combination with a multiturned helical spring 5 form the rotation element 7. This rotation element 7 causes the hardened surface of the sliding disk 4 to be in sliding engagement with the adjacent face of the sleeve bearing 2. Preferably, the sleeve bearing is made of a sintered material. The spring 5 surrounds the motor shaft 1, and its free end is connected to a snap ring 6 which is at the inner end of the shaft 1 on the opposite side of the spring from the ring disk 4. The end of the spring 5 can be hooked in the opening of the snap ring 6 in such a way that the rotation element 7 is rotatably carried therewith in synchronism with the rotation of the motor shaft 1. The spring 5 is preferably welded onto the ring disk 4 by laser beams. This provides a good weld without distorting the sliding surface of the disk 4 against which the face of the sleeve bearing 2 is in sliding relation. This very simple arrangement, as shown in FIG. 1, is only fully effective when the rotation of the motor is in the direction of the arrow 20 so that the engagement between the spring 5 and the snap ring 6 will be insured. It can be seen that on a reverse rotation of the shaft, the snap ring 6 would merely cam the end 5' of the spring 5 in a direction toward the sleeve bearing 2 without engaging the end 5' and causing it to rotate therewith. Thus, the helical direction of the spring winding, when considered in reference to the attached end of the spring, must be opposite to the anticipated direction of rotation of the motor shaft. It is noted that with this direction of spring helical winding, the driving or rotative force tends to unwind the spring rather than wind it tight against the shaft.

The axial limitation in the other direction of the shaft, as seen in FIG. 1, is provided by another sliding or ring disk 9, also preferably made of hardened steel, which is affixed to the housing hub 8 of the rotor (in this instance an outer rotor type motor) and which is adjacent the face of the sleeve bearing 2'. Thus, there is assurance that the sliding movements occur only between the faces of the oil drenched, sintered sleeve bearings and the respective ring disks, the disks preferrably being coated and made of a hardened steel. In FIG. 1, the spring 5 is shown in elevation for clarity rather than in section.

An alternative construction in accordance with the invention is shown in the sectional fragmentary view of FIG. 2. Here a small electric motor is provided with an axial pivot bearing in the form of an axial bearing disk 15 receiving the rounded end 14 of the motor shaft 1. This is particularly applicable in the instance where the shafts are vertically oriented. In this embodiment, a rotation element 7A includes a hardened steel disk 4 pressed against the face of the journal or sleeve bearing 2. The hardened steel disk 4 is engaged by a driving collar 10 in the form of an annular part made of molded plastic, for example, polyamide. This may be by the injection molding process. The driving collar 10 is provided with two drivers or bosses 11 and 11' which transmit a driving force when portions of the snap ring 6 engage the bosses during shaft rotation, thus rotating the collar 10 therewith. Between the steel disk 4 and the snap ring 6 around the shaft 1 is a stationary helical spring 5 which urges the ring disk 4 into engagement with the adjacent face of the sleeve bearing 2, as seen in FIG. 2. It is also advantageous that the rotor can be moved in the axial direction within limits defined by the predetermined path 12 between the collar 10 and the snap ring 6. The axial thrust or end bearing means are formed by the spherically shaped rotor shaft which rides on the axial bearing disk 15. The disk 15 is preferably made of a synthetic material that has the property of withstanding wear and is inserted in a recess 16 of a centering projection 17 of a motor housing casting 18.

FIG. 3 illustrates the section taken along the line AA of the construction shown in FIG. 2. The snap ring 6 lies between the drivers or bosses 11 and 11' of the collar 10 so that the collar 10 is connected thereby for rotation along with the motor shaft 1. The shaft 1 carries the rotation element 7A by a cam action between the snap ring when the motor shaft turns in the direction of the arrow. In this instance, the rotation element 7A will also be driven in the opposite direction for a motor that operates in the opposite direction because the other leg of the snap ring is then a kind of cam follower to the cam action of the drivers 11 and 11' of the collar 10. In either instance, the construction is chosen in such a way that the legs of the snap rings are pressed together by such cam action and that a further improvement of the driving force is insured thereby. The snap ring, of course, is a form of spring in the radial direction that is chosen to tightly grasp the motor shaft in a spring slot and thus provide an axial limit for the spring 5 as well as a rotative link for transferring rotative motion to the rotation elements 7 and 7A.

Figure 4:
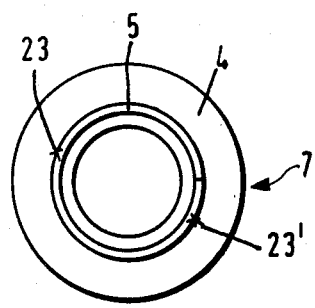
FIG. 4 is a top view of a rotation element in the construction according to FIG. 1.

FIG. 4 illustrates a top view of the rotation element 7 connected with a spring 5 in accordance with the embodiment shown in FIG. 1. At the marked points 23 and 23', the spring 5 is welded to the disk 4 by laser beams. This welding process assures a good weld between the parts without causing damage which would impair the durability of the bearing system by distorting the sliding surface of the disk 4 which is turned toward the sleeve bearing 2. Thus, a smooth interface is provided for the sliding action between the disk 4 and the face of the bearing 2.

FIG. 5 illustrates a side view of the rotation element 7 shown in FIG. 4. Upon examination, it will be seen that approximately three-quarters of a turn of the spring 5 is affixed to the disk 4 (as illustrated, for example, at the points marked 23 and 23' in FIG. 4). This three-quarters of a turn serves for a better fixation and welding of the spring 5 to the disk 4. The free end of the spring has a normal lead so that it can be hooked into the slit of the snap ring 6 and be carried thereby as the snap ring rotates along with the motor shaft 1.

Figure 6:
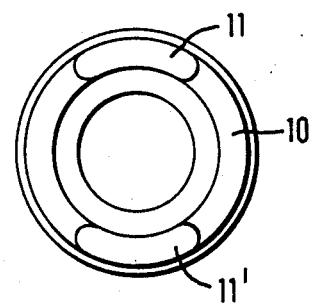
FIG. 6 is a top view of an alternative rotation element in the construction according to FIG. 2.
Figure 7:
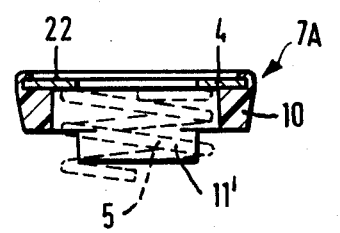
FIG. 7 is a sectional view of the rotation element according to FIG. 6.

FIGS. 6 and 7 illustrate the top and sectional view respectively of the rotation element 7A according to FIG. 2. The sliding surface 22 which engages the adjacent face of the bearing 2 in interfacial relation is part of a steel disk 4 which is connected to the collar 10. The collar 10, for example, can be a molded plastic part having a recess into which the disk 4 is receivedly engaged. It may also be formed by a stamping and bending metal process. It may be desirable to provide the outer perimeter of the steel disk 4 with roughened surfaces for an improved locking action between the disk 4 and the collar 10. At the other side of the rotation element 7A, both drivers 11 and 11' are somewhat pointed.

Figure 8:
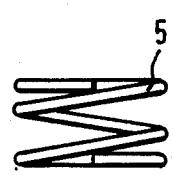
FIG. 8 is a side view of a helical spring according to the invention.

FIG. 8 illustrates a side view of a normal helical spring with its end turns terminating in planes parallel to each other as they are applied as a part of the driven element 7A according to FIGS. 6 and 7. A helical spring has been selected for the spring element 5 in both embodiments because of its "soft" nature. That is, its force exerted in the axial direction can be over a relatively long distance but is not an overly stiff or strong force.

The rotation elements 7 and 7A thus illustrated provide the spring action needed for their respective performance without change during long hours of operation. Their durability and consistency of performance is thus advantageous.

The invention is applicable for motors with horizontal or vertical motor axis. Thus, it is possible to interconnect the rotor and the stator of small electric motors in such a way that the spring element of the driven element reduces or entirely eliminates the effect of the axial magnetic forces between the axial active rotor and the stator material that otherwise caused the axial oscillations. Accordingly, there has been provided in accordance with the invention a construction for the reduction of axial rotor oscillations in small electric motors, the motors having slide bearing means and a motor shaft, and the construction comprising at least one driven element including spring means pressing against a ring disk, the opposite surface of which forms a sliding surface against an adjacent slide bearing, and means on the motor shaft for causing the rotation of the driven element in synchronism with the rotation of the motor.

Although the invention has been described in connection with a preferred embodiment and an alternative, other alternatives, modifications, and variations may be apparent to those skilled in the art in view of the foregoing description. Accordingly, it is intended to embrace all such alternatives, modifications, and variations as fall within the spirit and scope of the appended claims.

We claim:

1. In a small electric motor having a stator, a rotor, a shaft, a bearing tube, and a pair of sleeve bearing means having end faces and journalling the shaft and being mounted within the bearing tube in axially spaced relationship, the end faces facing each other being the inner faces and the other end faces being the outer faces, a construction for the reduction of axial rotor oscillations comprising a sliding surface surrounding a portion of the motor shaft and lying in a plane transversely of the shaft adjacent an outer end face of one of the sleeve bearing means; means causing relative sliding movements between only said sliding surface and the outer face of said one of the sleeve bearing means during rotation of the rotor, said means causing relative sliding movements surrounding a portion of the shaft adjacent the outer face of said one of the sleeve bearing means and being surrounded by a portion of the bearing tube; and means softy urging said sliding surface into sliding contact with the outer face of said one of the sleeve bearing means, said softly urging means surrounding a portion of the shaft while extending axially thereof adjacent the outer face of said one of the sleeve bearing means and being surrounded by a portion of the bearing tube.

2. A construction in accordance with claim 1 wherein said sliding surface includes a hardened steel ringlike disk and wherein said means causing relative sliding movements includes a formed component having means for holding and rotating said hardened steel ringlike disk and a drive boss extending axially away from said disk.

3. A construction in accordance with claim 2 wherein said formed component is made by injection molding of plastic.

4. A construction in accordance with claim 2 wherein said formed component is stamped out of metal by a punch process.

5. A construction in accordance with claim 1 wherein said means causing relative sliding movements and said softly urging means share elements in common including a hardened steel ringlike disk and a spring element urging said disk into sliding contact with the sleeve bearing.

6. A construction according to claim 2 wherein the means urging said sliding surface into sliding contact with the outer face of said one of the sleeve bearing means is a helical spring.

7. A construction in accordance with claim 5 wherein the spring element is a helical spring and wherein a weld connects said hardened ringlike disk on one end of said spring.

8. A construction in accordance with claim 1 wherein said means causing relative sliding movements includes a snap ring mounted in a groove on the motor shaft.

9. A construction in accordance with claim 2 wherein said means causing relative sliding movements includes a snap ring mounted in a groove on the motor shaft and wherein said snap ring contacts said drive boss and rotates said formed component during rotation of the rotor.

10. A construction in accordance with claim 7 wherein said means causing relative sliding movements includes a snap ring mounted in a groove on the motor shaft and wherein the snap ring engaged the other end of said spring to drive the ringlike disk through the spring during rotation of the motor.

11. A construction in accordance with claim 1 wherein axial movement of said shaft is further limited by an axial end bearing.

12. A construction in accordance with claim 10 wherein said weld connects a three-quarter turn of said helical spring to said ringlike disk and wherein said weld is made by laser welding and wherein the snap ring includes at least one generally radially extending leg and the free end of helical spring is engaged by this leg to rotate the helical spring and the ringlike disk.

13. A construction in accordance with claim 12 wherein the direction of turns of the helical spring from the fixed end is opposite to the direction of rotation of the motor shaft.

14. A construction in accordance with claim 2 wherein the means causing relative sliding movements includes an injection molded plastic ring having said ringlike disk embedded in one end and a pair of driving bosses extending axially away from said ringlike disk, the projecting bosses providing power transmission from the rotation of the motor shaft in either direction of rotation.

15. A construction in accordance with claim 1 and further including a second sliding surface at the opposite end of the motor shaft from the sleeve bearing means, said second sliding surface also fixed for rotation in synchronism with the shaft and wherein said urging means causes sliding action at the interfaces of two sets of ringlike disks and respective sleeve bearings.

* * * * *

UNITED STATES PATENT AND TRADEMARK OFFICE
CERTIFICATE OF CORRECTION

PATENT NO. : 4,613,778

DATED : September 23, 1986

INVENTOR(S) : Wrobel et al.

It is certified that error appears in the above-identified patent and that said Letters Patent is hereby corrected as shown below:

Col. 1, Line 29, change "on" to --of--.

Signed and Sealed this

Twenty-fourth Day of March, 1987

Attest:

DONALD J. QUIGG

Attesting Officer

Commissioner of Patents and Trademarks

UNITED STATES PATENT AND TRADEMARK OFFICE
CERTIFICATE OF CORRECTION

PATENT NO. : 4,613,778

DATED : September 23, 1986

INVENTOR(S) : Wrobel et al.

It is certified that error appears in the above-identified patent and that said Letters Patent is hereby corrected as shown below:

Col. 5, Line 60, change "softy" to --softly--.

Signed and Sealed this

Twenty-fifth Day of August, 1987

Attest:

DONALD J. QUIGG

*Attesting Officer*     *Commissioner of Patents and Trademarks*